US007992461B2

(12) United States Patent
Lin et al.

(10) Patent No.: US 7,992,461 B2
(45) Date of Patent: Aug. 9, 2011

(54) CIRCULATING DEVICE FOR MOTION GUIDE APPARATUS

(75) Inventors: Ming-Yao Lin, Taichung (TW); Chang Hsin Kuo, Taichung (TW); Zong-Sian Jiang, Taichung (TW)

(73) Assignee: Hiwin Technologies Corp., Situn, Taichung (TW)

( * ) Notice: Subject to any disclaimer, the term of this patent is extended or adjusted under 35 U.S.C. 154(b) by 291 days.

(21) Appl. No.: 12/455,879

(22) Filed: Jun. 9, 2009

(65) Prior Publication Data
US 2010/0107794 A1    May 6, 2010

(30) Foreign Application Priority Data

Oct. 31, 2008 (TW) ............................... 97141977 A

(51) Int. Cl.
*F16H 1/24*    (2006.01)
(52) U.S. Cl. ............... 74/424.86; 74/424.81; 74/424.82; 74/424.87; 74/424.88
(58) Field of Classification Search ............... 74/424.81, 74/428.82, 424.83, 424.86, 424.87, 424.88, 74/424.9, 424.75; 384/43, 45, 51
See application file for complete search history.

(56) References Cited

U.S. PATENT DOCUMENTS

| | | | | |
|---|---|---|---|---|
| 5,993,064 A | * | 11/1999 | Teramachi et al. | 384/43 |
| 6,082,210 A | * | 7/2000 | Ise | 74/424.83 |
| 6,089,117 A | | 7/2000 | Ebina et al. | 74/459 |
| 6,282,971 B1 | * | 9/2001 | Shirai et al. | 74/424.87 |
| 6,776,063 B2 | * | 8/2004 | Watanabe | 74/424.86 |
| 7,201,076 B2 | * | 4/2007 | Ohkubo | 74/424.75 |
| 7,337,689 B2 | * | 3/2008 | Yamamoto et al. | 74/424.75 |
| 2006/0169079 A1 | * | 8/2006 | Lee et al. | 74/424.82 |
| 2010/0031763 A1 | * | 2/2010 | Kuo | 74/424.86 |
| 2010/0050801 A1 | * | 3/2010 | Kuo | 74/424.87 |
| 2010/0101349 A1 | * | 4/2010 | Kuo et al. | 74/424.86 |

FOREIGN PATENT DOCUMENTS

JP    2007263192 A    * 10/2007
* cited by examiner

*Primary Examiner* — Richard W Ridley
*Assistant Examiner* — Matthew A Johnson
(74) *Attorney, Agent, or Firm* — Charles E. Baxley

(57) ABSTRACT

A motion guide device includes a ball nut attached onto a shaft and having helical grooves for receiving ball bearing elements, a tubular member is engaged with the ball nut and includes a ball circulating pathway communicative with the helical groove of the ball nut, and includes an intermediate segment, two curved segments, and two end coupling segments each having a ball guiding channel which includes a wider inner section for guiding and circulating the flexible coupling member of a ball coupler to smoothly move through the ball guiding channel of each end coupling segment and for preventing the flexible coupling member from being twisted. The tubular member is preferably formed by two half members.

7 Claims, 8 Drawing Sheets

CIRCULATING DEVICE FOR MOTION GUIDE APPARATUS

BACKGROUND OF THE INVENTION

1. Field of the Invention

The present invention relates to a motion guide apparatus, such as a linear motion guide apparatus or a ball screw device, and more particularly to a motion guide apparatus including two movable members or a screw shaft and a ball nut movable relative to each other, and a ball circulating device attached to one of the two movable members for suitably circulating and guiding the ball bearing elements to move through an endless ball guiding passage in the ball screw device or between the two movable members.

2. Description of the Prior Art

Typical motion guide apparatuses, such as the linear motion guide apparatuses or the ball screw devices comprise two movable members rotatable or movable relative to each other, and a number of ball bearing elements disposed between the two movable members for facilitating the sliding movement between the two movable members, and two or more ball circulating elements attached to the ball nut and communicative with the helical groove portions of the screw shaft and the ball nut for forming an endless ball guiding passage in the ball screw device or between the two movable members and for slidably receiving a number of ball bearing elements.

For example, U.S. Pat. No. 6,089,117 to Ebina et al. discloses one of the typical ball screw devices comprising a ball nut pivotally or rotatably coupled onto a screw shaft, and a helically running threaded channel provided between the screw shaft and the ball nut for receiving a number of loaded ball bearing elements and for facilitating the sliding movement between the screw shaft and the ball nut, and two or more re formed with circulating elements attached to the ball nut and communicative with the helical groove portions of the screw shaft and the ball nut for forming the endless helically running threaded channel in the ball screw device or between the screw shaft and the ball nut.

For suitably or smoothly guiding or circulating the ball bearing elements through the ball circulating channels in the tubular circulating elements, the tubular circulating elements each include four guide grooves formed through the length of each of the tubular circulating elements and communicative with the returning channels of the tubular circulating elements respectively for receiving or engaging with the flexible coupling members of the ball couplers that hold or support the ball bearing elements.

However, the end portions of the tubular circulating elements include a ninety degree (90) turning angle, and the guide grooves of the tubular circulating elements are also turned with a ninety degree (90) angle, and the flexible coupling members of the ball couplers are snugly fitted and received or engaged with the guide grooves of the tubular circulating elements such that the flexible coupling members of the ball couplers may be twisted by the tubular circulating elements and such that the ball bearing elements may not be suitably guided to move through the ball running channel of the tubular circulating elements.

The present invention has arisen to mitigate and/or obviate the afore-described disadvantages of the conventional motion guide apparatuses or ball screw devices.

SUMMARY OF THE INVENTION

The primary objective of the present invention is to provide a motion guide apparatus including two movable members movable relative to each other, and a ball circulating device attached to one of the two movable members or a screw shaft and a ball nut for suitably guiding and circulating the ball bearing elements to move through an endless ball guiding passage in the ball screw device or between the two movable members.

In accordance with one aspect of the invention, there is provided a motion guide apparatus comprising an elongated shaft including a helical groove formed on an outer peripheral surface thereof, a ball nut movably attached onto the elongated shaft, and including a bore formed therein for receiving the elongated shaft, and including a helical groove formed therein, and including two orifices formed therein and communicative with the helical groove of the ball nut, a ball circulating device including a tubular member engaged with the orifices of the ball nut and including a ball circulating pathway formed in the tubular member and communicative with the helical groove of the ball nut for forming an endless ball guiding passage between the ball nut and the elongated shaft, the tubular member of the ball circulating device including an intermediate segment, two curved segments formed and located at two end portions of the intermediate segment, and two end coupling segments formed and located at an outer portion of the curved segments respectively, and the ball circulating pathway of the tubular member being formed by an intermediate portion, two curved portions, and two end coupling portions, a number of ball bearing elements received and engaged with the endless ball guiding passage, and a ball coupler including a flexible coupling member having a number of openings formed in the flexible coupling member for receiving and engaging with the ball bearing elements, and the intermediate portion and the curved portions of the ball circulating pathway of the tubular member include an inner diameter "D" no less than a width "W" of the flexible coupling member for allowing the flexible coupling member to be freely moved and rotated relative to the intermediate segment and the curved segments of the tubular member, the tubular member includes a ball guiding channel formed in each of the end coupling segments, and the ball guiding channel of each end coupling segment include a middle section and an inner section, and the inner section of the ball guiding channel of each end coupling segment includes a wider inner end communicative with the curved portion of the curved segment and having a width "T" greater than a width "h" of the middle section of the ball guiding channel of each end coupling segment for circulating and guiding the flexible coupling member to move through the ball guiding channel of each end coupling segment and for preventing the flexible coupling member of the ball coupler from being twisted or distorted by the end coupling segments of the tubular member.

The tubular member includes two protrusions oppositely extended into each of the end coupling portions of the ball circulating pathway of the tubular member for forming the ball guiding channel in the end coupling segments and for receiving or guiding or engaging with the flexible coupling member of the ball coupler.

The width "T" of the inner end of the inner section of the ball guiding channel of each end coupling segment is equal to or no less than the inner diameter "D" of the intermediate segment and the curved segments.

The ball guiding channel of each end coupling segment include an outer section communicative with the middle section of the ball guiding channel of each end coupling segment and communicative with the helical groove of the ball nut, and the outer section of the ball guiding channel of each end coupling segment includes a width no less than the width "h"

of the middle section of the ball guiding channel of each end coupling segment for receiving and anchoring or guiding or engaging with the flexible coupling member of the ball coupler.

The outer section of the ball guiding channel of each end coupling segment includes an inner end having a width "h" equals to the width "h" of the middle section of the ball guiding channel of each end coupling segment, and includes an outer end having a width "t" greater than the width "h" of the middle section of the ball guiding channel of each end coupling segment for suitably circulating and guiding the flexible coupling member to smoothly move through the ball guiding channel of each end coupling segment.

The width "t" of the outer end of the outer section of the ball guiding channel of each end coupling segment is smaller than the inner diameter "D" of the intermediate segment and the curved segments.

The tubular member includes two half members each having one half of the intermediate segment and the curved segments and the end coupling segments, and each having one half of the ball circulating pathway formed therein for allowing the tubular member to be easily and quickly manufactured or formed.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
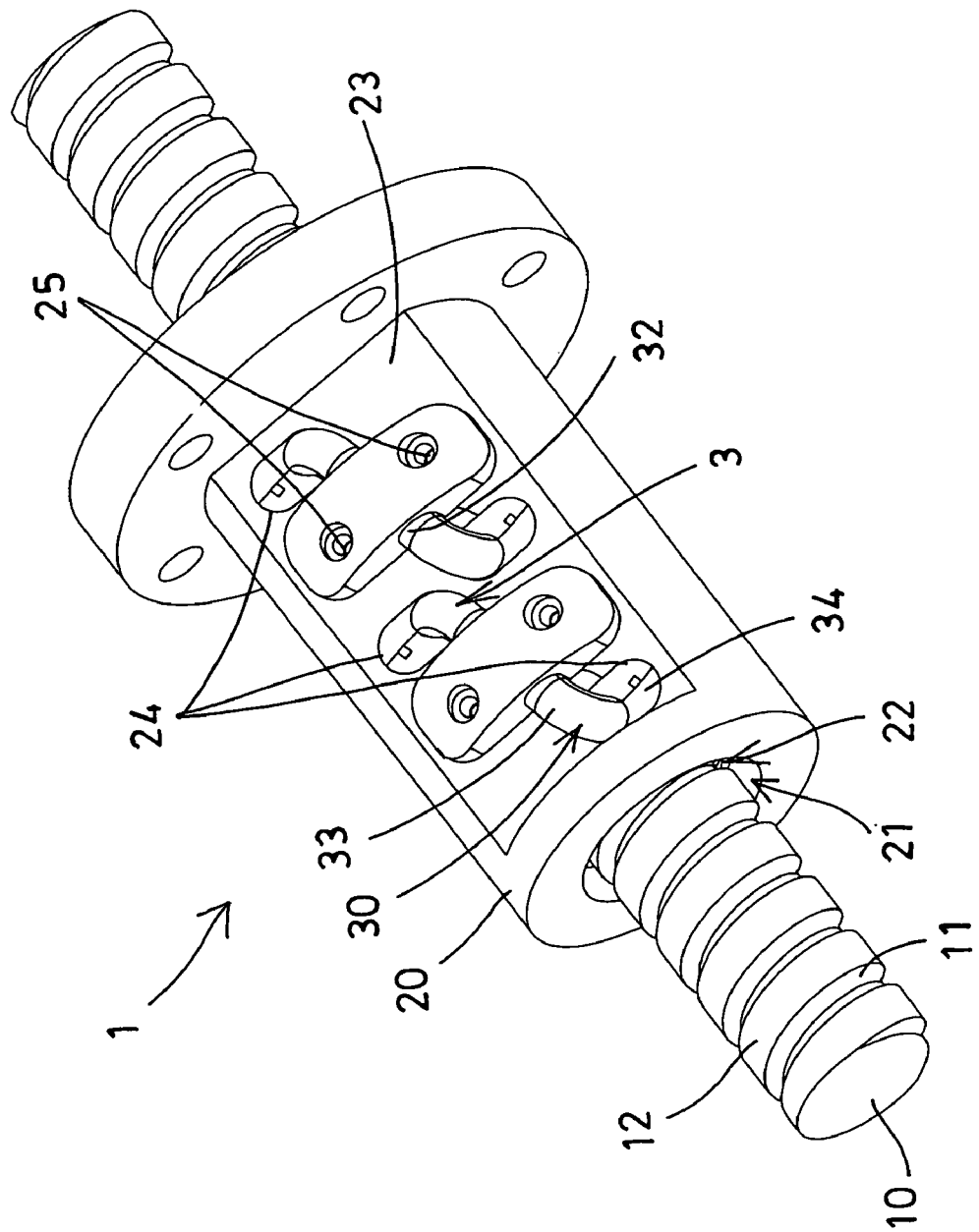
FIG. 1 is a partial perspective view of a motion guide apparatus in accordance with the present invention.
Figure 2:
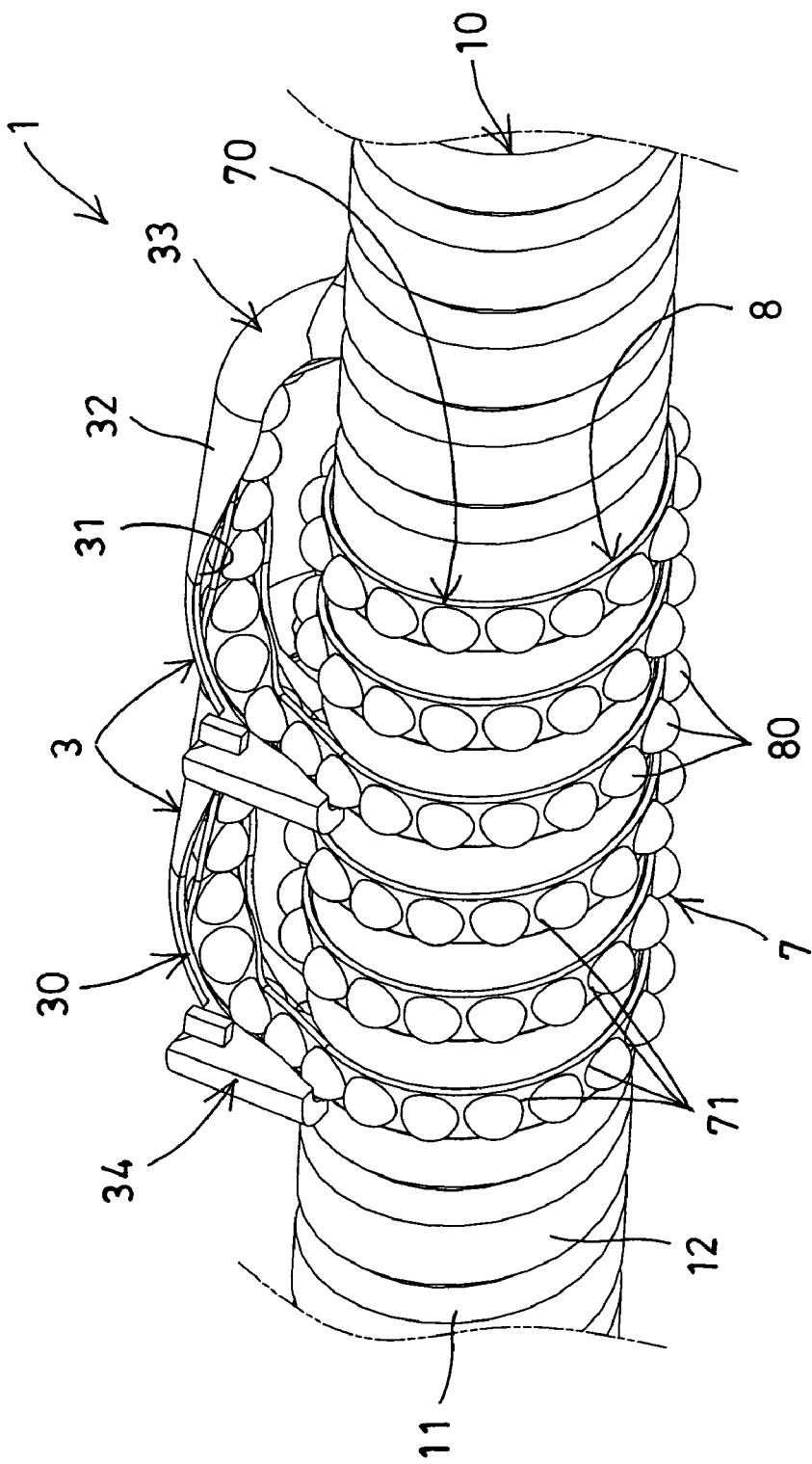
FIG. 2 is another partial perspective view of the motion guide apparatus.

Referring to the drawings, and initially to FIGS. 1 and 2, a motion guide apparatus 1 in accordance with the present invention, such as a ball screw device 1, comprises an elongated bolt or screw shaft 10 including a number of helical threaded portions or grooves 11 formed on the outer peripheral portion thereof, or formed in the outer peripheral surface 12 thereof, and a movable member, such as a ball nut 20 including a screw hole or bore 21 formed therein for receiving or engaging with the elongated screw shaft 10, and the screw hole or bore 21 of the ball nut 20 is formed or defined by a number of helical threaded portions or grooves 22 for threading or engaging or aligning with the helical threaded portions or grooves 11 of the screw shaft 10, and for forming one or more endless multiple-turn, helical raceways or ball guiding passages 8 (FIG. 2) between the screw shaft 10 and the ball nut 20, and for slidably receiving a number of ball bearing elements 80 and for facilitating the sliding or rotational movement between the two movable members 10, 20 or the screw shaft 10 and the ball nut 20.

The ball nut 20 includes a cut off portion or a flat surface 23 formed in the outer peripheral portion thereof, and includes two or more orifices 24 formed therein and intersecting or communicating with the cut off portion or flat surface 23 of the ball nut 20, and also intersecting or communicating with the ball guiding passages 8 or the helical threaded portions or grooves 11, 22 of the screw shaft 10 and the ball nut 20 for receiving or engaging with the ball circulating devices 3 which are engaged with or attached or mounted or secured to the ball nut 20 with latches or fasteners 25 (FIG. 1) for guiding or circulating or returning the ball bearing elements 80 to move cyclically in the endless multiple-turn, helical raceway or ball guiding passage 8 of the ball screw device 1.

Figure 3:
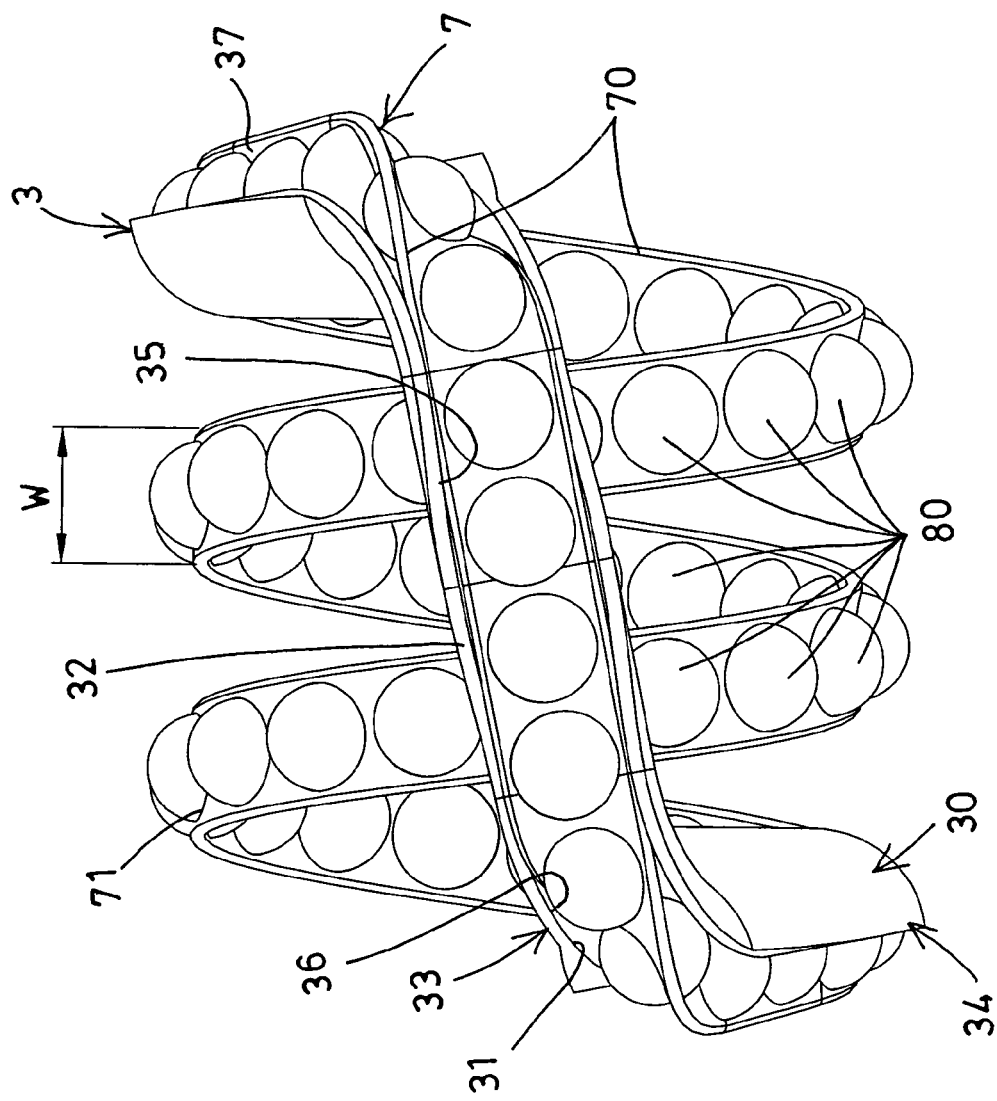
FIG. 3 is a further partial perspective view of the ball coupler of the motion guide apparatus.
Figure 4:
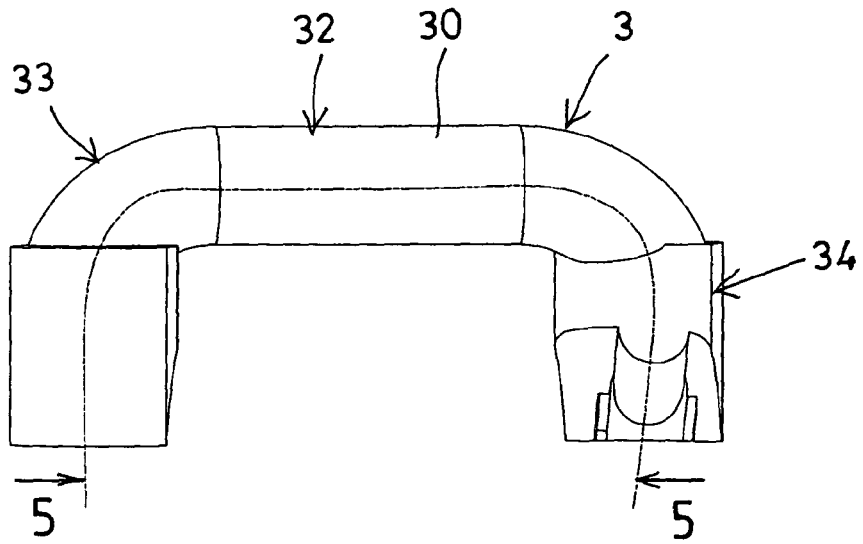
FIG. 4 is a plan schematic view of the ball circulating device for the motion guide apparatus.

As also shown in FIGS. 2 and 3, the motion guide apparatus 1 further includes one or more ball couplers 7 each having a flexible coupling member 70 and each having a number of openings 71 formed in the flexible coupling member 70 for receiving or attaching or holding or supporting or engaging with the ball bearing elements 80 and for stably anchoring and positioning the ball bearing elements 80 between the screw shaft 10 and the ball nut 20 or in the endless multiple-turn, helical raceway or ball guiding passage 8 of the ball screw device 1 and for facilitating the sliding movement between the screw shaft 10 and the ball nut 20. The above-described structure is typical and will not be described in further details.

As shown in FIGS. 1-9, the ball circulating devices 3 each include a tubular member 30 having a ball circulating pathway 31 formed therein for suitably and rotatably and/or movably receiving or engaging with or positioning the ball bearing elements 80 therein, in which the tubular member 30 of each ball circulating device 3 includes a substantially C or U-shaped structure having a straight middle or longitudinal or intermediate segment 32, two curved segments 33 formed or located at the two end portions of the intermediate segment 32, and two straight end coupling segments 34 formed or located at the outer or free end portions of the curved segments 33 respectively, and in which the ball circulating pathway 31 of the tubular member 30 of each ball circulating device 3 is formed or defined by an intermediate portion 35, two curved portions 36, and two straight end coupling portions 37.

As shown in FIGS. 2-3, 5, and 10-12, the intermediate portion 35 and the curved portions 36 of the ball circulating pathway 31 of the tubular member 30, or of the intermediate segment 32 and the curved segments 33 include an inner diameter "D" (FIG. 5) equals to or slightly greater or no less than the width "W" (FIG. 3) of the flexible coupling member 70 or of the ball coupler 7 and arranged for allowing the flexible coupling member 70 of the ball coupler 7 to be freely moved and rotated relative to the intermediate segment 32 and the curved segments 33 of the tubular member 30 without any interference or obstruction. The end coupling portion 37 of each end coupling segment 34 include an inner diameter "d" (FIG. 5) slightly smaller than the inner diameter "D" of the intermediate segment 32 and the curved segments 33. As shown in FIGS. 1-3 and 13-14, it is preferable that the end coupling segments 34 are curved or inclined or tilted relative to the intermediate segment 32 and/or the curved segments 33 such that the ball circulating pathway 31 of the tubular member 30 includes a substantially S-shaped structure or configuration, but not the straight C or U-shaped structure or configuration for smoothly receiving or engaging with the ball bearing elements 80.

As shown in FIGS. 5-11, the tubular member 30 of each ball circulating device 3 includes one or more (such as two) narrowed ball guiding channels 38 oppositely formed in each of the end coupling segments 34 of the tubular member 30, or includes one or more (such as two) protrusions 39 oppositely extended or engaged into each of the end coupling portions 37 of the ball circulating pathway 31 of the tubular member 30, or each of the end coupling segments 34 for forming or defining the narrowed ball guiding channels 38 in the end coupling segments 34, and the ball guiding channel 38 of each end coupling segment 34 includes a funnel-shaped structure having a first or inner section 40 located close to and communicative with the curved portion 36 of the curved segment 33, a second or middle section 41 located in the middle or intermediate portion of the end coupling segment 34, and a third or outer section 42 communicative with the second or middle section 41 of the ball guiding channel 38 of each end coupling segment 34 and also communicative with the helical groove 22 of the ball nut 20.

Figure 5:
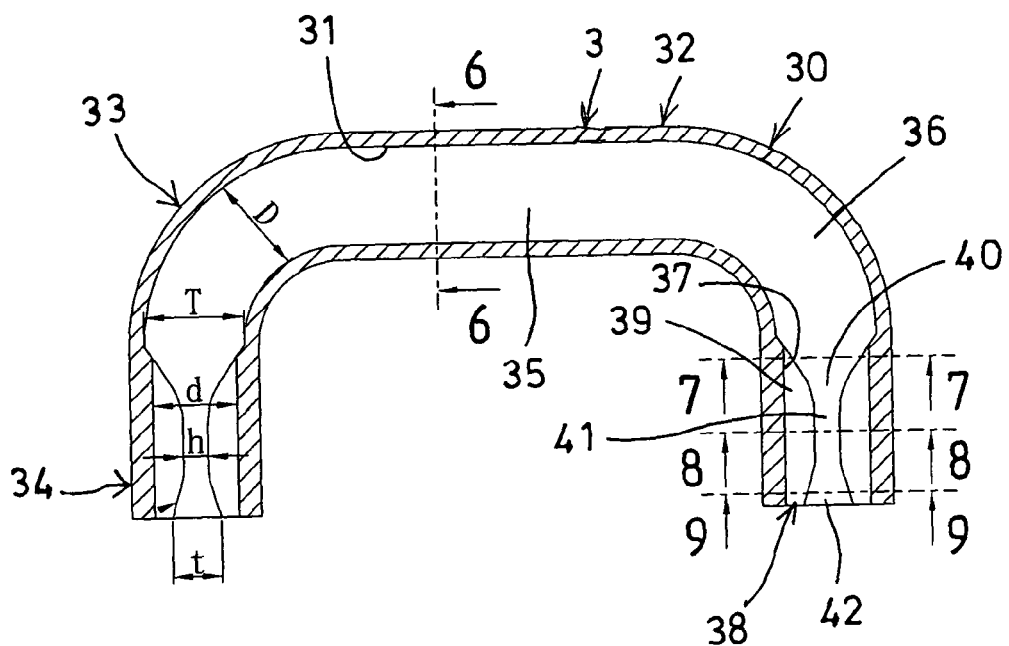
FIG. 5 is a cross sectional view of the ball circulating device of the motion guide apparatus taken along lines 5-5 of FIG. 4.
Figure 6:
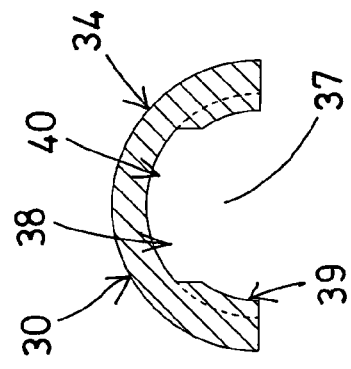
FIGS. 6, 7, 8, 9 are cross sectional views of the ball circulating device of the motion guide apparatus taken along lines 6-6, 7-7, 8-8, and 9-9 of FIG. 5 respectively.
Figure 7:
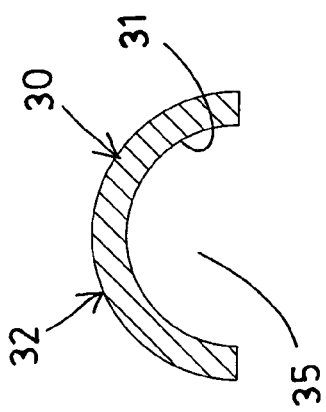
Figure 8:
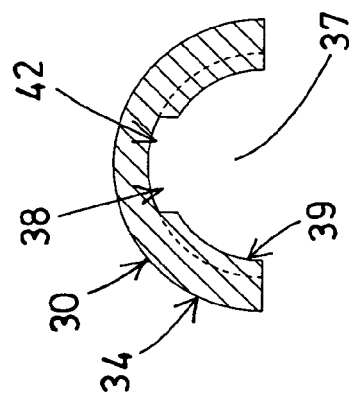
Figure 9:
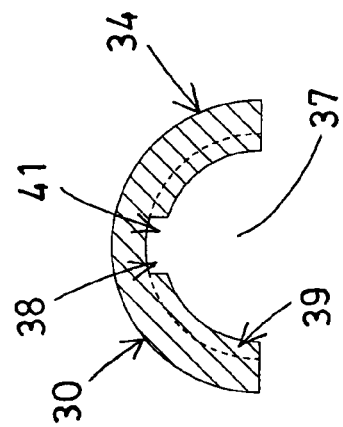
Figure 10:
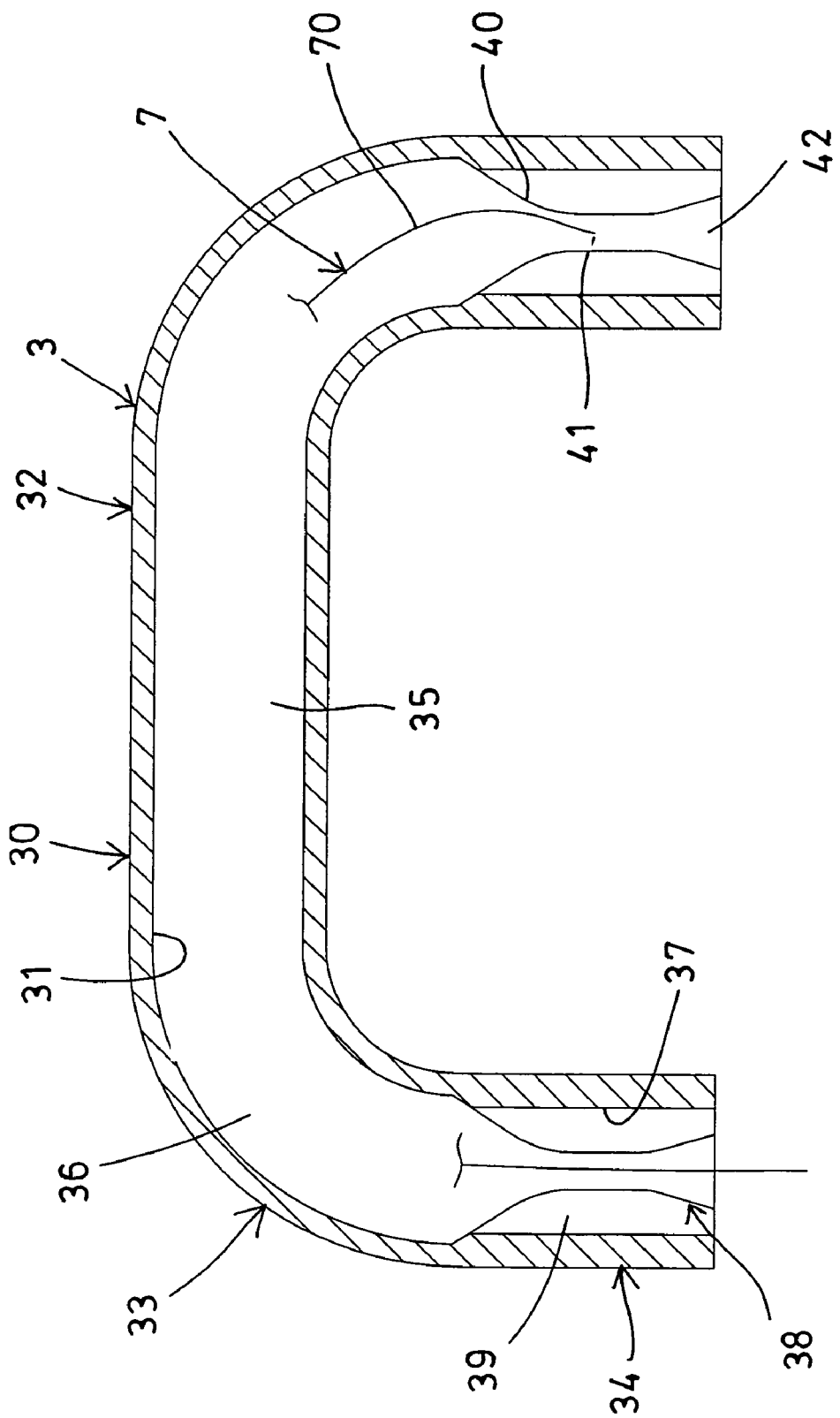
FIGS. 10, 11 are other cross sectional views similar to FIG. 5 illustrating the operation of the ball circulating device of the motion guide apparatus.

As also shown in FIG. 5, the first or inner section 40 of the ball guiding channel 38 of each end coupling segment 34 includes a wider inner end having a width "T" equals to or no less than the inner diameter "D" of the intermediate segment 32 and the curved segments 33 and wider or greater than the width "h" of the second or middle section 41 of the ball guiding channel 38 of each end coupling segment 34 for suitably circulating and guiding the flexible coupling member 70 of the ball coupler 7 to move through the ball guiding channel 38 of each end coupling segment 34, and includes a narrowed outer end having a width "h" equals to the width "h" of the second or middle section 41 of the ball guiding channel 38 of each end coupling segment 34, and the width "h" of the second or middle section 41 of the ball guiding channel 38 of each end coupling segment 34 is greater than the thickness of the flexible coupling member 70 of the ball coupler 7 for allowing the flexible coupling member 70 of the ball coupler 7 to be suitably guided to move from the wider inner end of the first or inner section 40 of the ball guiding channel 38 of each end coupling segment 34 into and through the narrowed second or middle section 41 of the ball guiding channel 38 of each end coupling segment 34, best shown in FIG. 10.

Figure 11:
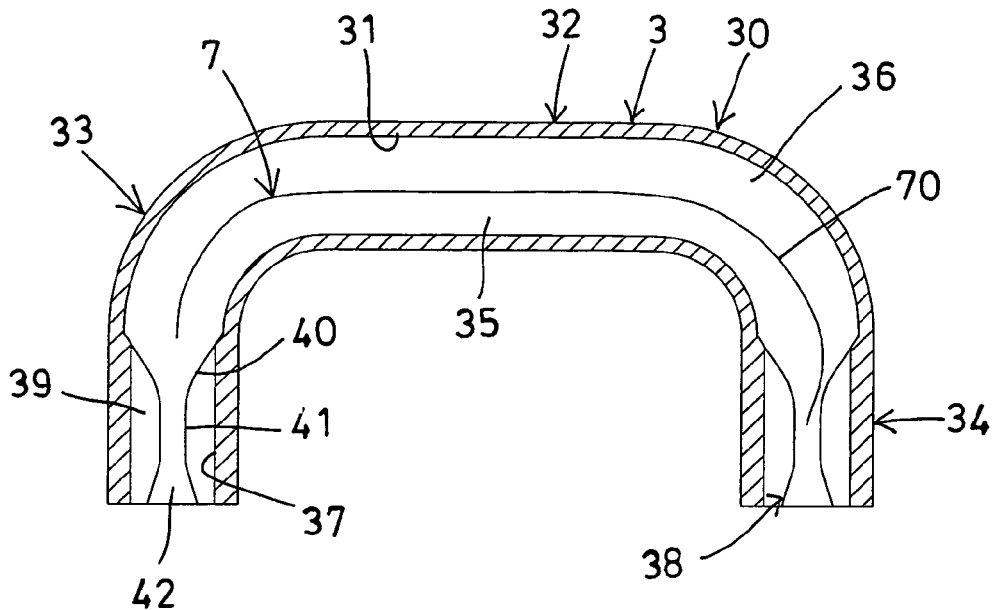

The third or outer section 42 of the ball guiding channel 38 of each end coupling segment 34 includes a narrowed inner end having a width "h" equals to or no less than the width "h" of the second or middle section 41 of the ball guiding channel 38 of each end coupling segment 34, and includes a wider outer end having a width "t" slightly smaller than the inner diameter "D" of the intermediate segment 32 and the curved segments 33 and slightly greater than the width "h" of the second or middle section 41 of the ball guiding channel 38 of each end coupling segment 34 for suitably circulating and guiding the flexible coupling member 70 of the ball coupler 7 to move through the ball guiding channel 38 of each end coupling segment 34. As shown in FIG. 11, it is preferable, but not necessarily that the flexible coupling member 70 of the ball coupler 7 includes a length equals to or slightly smaller than the length of the intermediate segment 32 and one curved segments 33 and plus one end coupling segment 34 of the tubular member 30.

Figure 12:
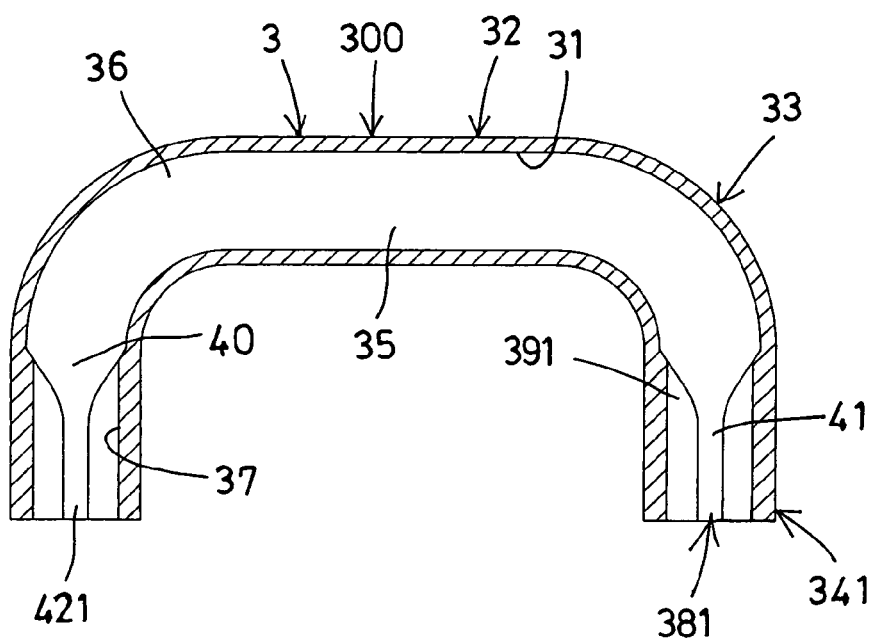
FIG. 12 is a further cross sectional view illustrating the further arrangement of the ball circulating device of the motion guide apparatus.

Alternatively, as shown in FIG. 12, the ball guiding channel 381 of each end coupling segment 341 of each tubular member 300 may include a third or outer section 421 formed by a protrusion 391 and having a width equals to the width of the second or middle section 41 of the ball guiding channel 381 of each end coupling segment 341, and may also be provided to suitably guide the flexible coupling member 70 of the ball coupler 7 to smoothly move from the wider inner end of the first or inner section 40 of the ball guiding channel 381 of each end coupling segment 341 into and through the narrowed second or middle section 41 of the ball guiding channel 381 of each end coupling segment 341.

Figure 14:
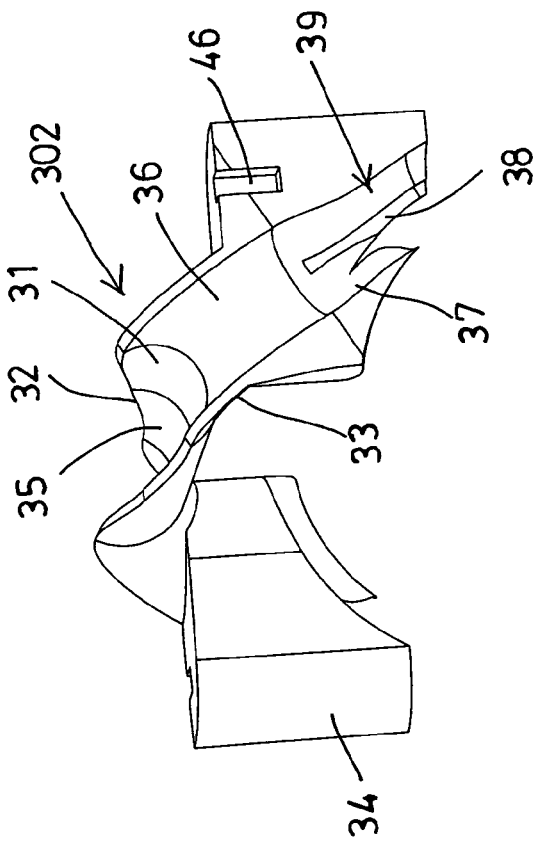
FIGS. 13, 14 are partial perspective views illustrating the ball circulating channel and the two half members of the ball circulating device of the motion guide apparatus.
Figure 13:
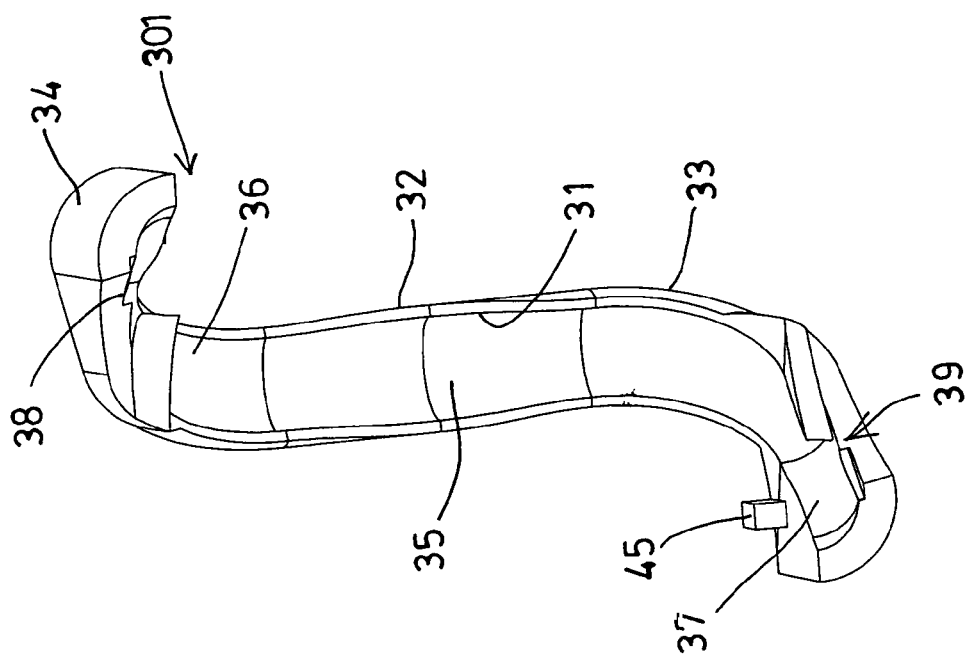

As shown in FIGS. 13-14, the ball circulating devices 3 each further include two half members 301, 302 each having one half of the intermediate segment 32 and the curved segments 33 and the end coupling segments 34, and each having one half of the ball circulating pathway 31 formed therein, and the two half members 301, 302 may be mounted or secured together with projections or latches 45 (FIG. 13) and lock notches 46 (FIG. 14), and the end coupling portion 37 of the ball circulating pathway 31 of each end coupling segment 34 also includes two narrowed ball guiding channels 38 oppositely formed in each of the end coupling segments 34 of the tubular member 30 and formed or defined by two protrusions 39 for suitably circulating and guiding the ball bearing elements 80 to move through the ball guiding channels 38 of the end coupling segments 34.

In operation, as shown in FIG. 10, the flexible coupling member 70 of the ball coupler 7 is arranged for allowing the flexible coupling member 70 of the ball coupler 7 to be freely moved and rotated relative to the intermediate segment 32 and the curved segments 33 of the tubular member 30 without any interference or obstruction, and the flexible coupling member 70 of the ball coupler 7 may also be guided to suitably move from the wider inner end of the first or inner section 40 of the ball guiding channel 38 of each end coupling segment 34 into and through the narrowed second or middle section 41 of the ball guiding channel 38 of each end coupling segment 34 for preventing the flexible coupling member 70 of the ball coupler 7 from being twisted or distorted by the end coupling segments 34 of the tubular member 30.

Accordingly, the motion guide apparatus in accordance with the present invention includes two movable members movable relative to each other, and a ball circulating device attached to one of the two movable members or a screw shaft and a ball nut for suitably circulating and guiding the ball bearing elements to move through an endless ball guiding passage in the ball screw device or between the two movable members.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A motion guide apparatus comprising:
an elongated shaft including a helical groove formed on an outer peripheral surface thereof,
a ball nut movably attached onto said elongated shaft, and including a bore formed therein for receiving said elongated shaft, and including a helical groove formed therein, and including two orifices formed therein and communicative with said helical groove of said ball nut,
a ball circulating device including a tubular member engaged with said orifices of said ball nut and including a ball circulating pathway formed in said tubular member and communicative with said helical groove of said ball nut for forming an endless ball guiding passage between said ball nut and said elongated shaft, said tubular member of said ball circulating device including an intermediate segment, two curved segments formed and located at two end portions of said intermediate segment, and two end coupling segments formed and located at an outer portion of said curved segments respectively, and said ball circulating pathway of said tubular member being formed by an intermediate portion, two curved portions, and two end coupling portions, a plurality of ball bearing elements received and engaged with said endless ball guiding passage, and a ball coupler including a flexible coupling member having a plurality of openings formed in said flexible coupling member for receiving and engaging with said ball bearing elements, and wherein said intermediate portion and said curved portions of said ball circulating pathway of said tubular member include an inner diameter (D) no less than a width (W) of said flexible coupling member for allowing said flexible coupling member to be freely moved and rotated relative to said intermediate segment and said curved segments of said tubular member, said tubular member includes a ball guiding channel formed in each of said end coupling segments, and said ball guiding channel of each end coupling segment include a middle section and an inner section, and said inner section of said ball guiding channel of each end coupling segment includes a wider inner end communicative with said curved portion of said curved segment and having a width (T) greater than a width (h) of said middle section of said ball guiding channel of each end coupling segment for circulating and guiding said flexible coupling member to move through said ball guiding channel of each end coupling segment.

2. The motion guide apparatus as claimed in claim 1, wherein said tubular member includes two protrusions oppositely extended into each of said end coupling portions of said ball circulating pathway of said tubular member for forming said ball guiding channel in said end coupling segments.

3. The motion guide apparatus as claimed in claim 1, wherein said width (T) of said inner end of said inner section of said ball guiding channel of each end coupling segment is equal to said inner diameter (D) of said intermediate segment and said curved segments.

4. The motion guide apparatus as claimed in claim 1, wherein said ball guiding channel of each end coupling segment include an outer section communicative with said middle section of said ball guiding channel of each end coupling segment and communicative with said helical groove of said ball nut, and said outer section of said ball guiding channel of each end coupling segment includes a width no less than the width (h) of said middle section of said ball guiding channel of each end coupling segment.

5. The motion guide apparatus as claimed in claim 4, wherein said outer section of said ball guiding channel of each end coupling segment includes an inner end having a width (h) equal to the width (h) of said middle section of said middle section of said ball guiding channel of each end coupling segment, and includes an outer end having width (t) greater than the width (h) of said middle section of said ball guiding channel of each end coupling segment.

6. The motion guide apparatus as claimed in claim 5, wherein the width (t) of said outer end of said outer section of said ball guiding channel of each end coupling segment is smaller than the inner diameter (D) of said intermediate segment and said curved segments.

7. The motion guide apparatus as claimed in claim 1, wherein said tubular member includes two half members each having one half of said intermediate segment and said curved segments and said end coupling segments, and each having one half of said ball circulating pathway formed therein.

\* \* \* \* \*